Patented Apr. 13, 1954

2,675,321

UNITED STATES PATENT OFFICE 2,675,321

COATED PIGMENT AND MINERAL OIL INK CONTAINING SAME

George L. M. Christopher, New Canaan, Conn., and Frank Tarantino, North Plainfield, N. J., assignors to American Cyanamid Company, New York, N. Y., a corporation of Maine No Drawing. Application June 12, 1951, Serial No. 231,266

9 Claims. (Cl. 106—32)

This invention relates to an improved pigment dispersion in hydrocarbon printing inks.

In the past, most printing inks have been made up in the form of a quick-setting varnish, the greater portion of the vehicle being predominantly of the drying oil type. These printing inks have, for the most part, exhibited satisfactory rheological properties and acceptable strength and texture. They have, however, some drawbacks, for example, the cost of a drying oil varnish constitutes a substantial cost factor, also, there is a tendency for printing inks of the varnish type to set up when exposed to the air, which has presented some storage problems.

It has long been desired to produce a satisfactory printing ink using most organic pigments and some inorganic pigments, in which the vehicle is a mineral oil, that is to say, predominantly non-aromatic hydrocarbons. However, up to the present time, with a few special purpose exceptions, mineral oil base printing inks have not given quality printing because of the poor dispersion of pigments in this vehicle, which cause increase of plastic viscosity, yield values and thixotropy. Strength and texture have also frequently been relatively unsatisfactory.

The present invention is based on the surprising fact that certain thiophosphatosuccinates, when present in small quantities, produce an excellent dispersion with markedly improved rheological properties, such as plastic viscosity, yield value and thixotropy, and in many cases also with an improved texture and strength. The compounds have the following general formula:

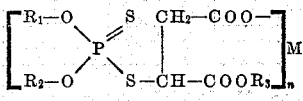

in which $R_1$, $R_2$ and $R_3$ are alkyl radicals, M is an alkali forming metal and $n$ is the valence of M. The total number of carbon atoms in $R_1$, $R_2$ and $R_3$ should not be less than eighteen. The nature of the alkali forming metal is not critical. Best results, are, however, obtained with higher molecular alkaline earth metals such as barium.

Dithiophosphatosuccinates have been primarily considered as wetting agents, that is to say, materials which are particularly useful in aqueous media or media containing a water phase. It is not known why they exert the peculiar improvement in systems where a pigment is dispersed in a predominantly non-aromatic hydrocarbon solvent such as mineral oil base printing inks, and it is not desired to limit the invention to any theory of how the dithiophosphatosuccinate functions.

Various methods of incorporating the dithiophosphatosuccinates into the mineral oil printing inks are possible:

The first method involves introducing the dithiophosphatosuccinate into the printing ink when it is being prepared.

The second method is to slurry the pigment in an aqueous medium with a dithiophosphatosuccinate, recovering the coated pigment and drying it. The product of this second method is in itself a new composition in which the dithiophosphatosuccinate is uniformly coated onto the pigment particles.

The third method is one in which the dithiophosphatosuccinate is mixed with the pigment in the form of a press cake, mineral oil added, and the emulsion broken. This flushes the pigment into the mineral oil. The water layer can then be decanted.

The fourth method involves adding the dithiophosphatosuccinate to the oil or ink vehicle itself. This last method makes it possible to use untreated pigments and in some cases, this added flexibility is of practical importance. When the fourth method is used, barium salts of the dithiophosphatosuccinates give better results which is in contrast to the other three methods in which sodium salts are usually preferable.

The methods are, to a large extent, interchangeable, though certain pigments are more easily treated by one method than by the other. For example, the pigment alkali blue (phenolated para-rosaniline), which is a particularly bad bodying pigment in mineral oil inks, is preferably treated by the second of the four methods described above. It is an advantage of the present invention that the method of introducing the dithiophosphatosuccinate is flexible and the most convenient method may be used by the colorist in each case.

The amount of the dithiophosphatosuccinate to be used is not critical and will vary with different types of pigments. Thus, for example, 10–30% gives good results with pigments such as alkali blue, while much smaller amounts are preferable with pigments such as titanium dioxide where as little as about 1% will give effective results. Certain other pigments, such as carbon black, require larger amounts of agent for best results. In general, however, it is economically not worth while to use more than 60–100% of agent, although even larger quantities may be employed without harm in many cases. The amount of agent to be used for optimum results depends, to a considerable extent, upon the surface area of the pigment. When the pigment has a relatively small surface area, such as 8–10 square meters per gram as in the case of titanium dioxide, very small amounts of agent ranging down to 1% or less can be used. Alkali blue, with about 100 square meters of surface area per gram, required more agent as has been pointed out above.

The variation in the amount of agent required for various pigments, depending on their surface area, is in line with the known facts that in pigment dispersion it is the character of the surface of the pigment which counts. In general, the minimum useful amount of agent is that corresponding to a monomolecular layer. Polymolecular layers, that is an excess over the minimum required, are often desirable, as they give a greater margin of safety and insure that there is a full coating of all of the pigment. The present invention, therefore, contemplates any amount of agent above the minimum corresponding to the monomolecular layer of the pigment used.

The invention will be described in greater detail in conjunction with the specific examples where, for the most part, precise laboratory and milling procedures are recited in order to permit accurate reproducibility, it being difficult to define the exact degree of mixing effected with different designs of ink mills without specifying the exact structure, which of course plays no part in the present invention. The practical colorist is accustomed to translating precise laboratory and mulling procedures into the proper procedure for ink mixing machines of the particular design which he may be using in his plant. The improvements in rheological properties, strength and texture are the same, regardless of whether the inks are prepared by precision laboratory mulling technique or in the customary ink mills. In the examples the parts are by weight unless otherwise specified.

The present invention is applicable to organic and inorganic pigments generally. Among the most important are alkali blue, which has been referred to above, phloxine toner, barium lithol red, peacock blue, chrome yellow, chrome green, iron blues and titanium dioxide. The agents of the present invention impart improved rheological properties to all of the pigments, with the exception of the benzidine yellows which are known to be unresponsive to the usual dispersing agents in printing inks. The degree of improvement in rheological properties will vary with different pigments and with different agents and an agent which gives extremely good results with one pigment may give mediocre results with another. It is not known why there should be considerable variation in the degree of improvement obtained by using the present invention, therefore it is not intended to limit the invention to a theory as to why there are differences in results. However, the effect seems to be entirely a surface effect. Therefore, it seems probable that different affinities for different pigments, which result in more or less complete coatings, may well be important factors.

EXAMPLE 1

75 parts of each of a series of surface-active agents were spatula mulled in 925 parts of mineral ink oil. This was then mulled 4×100 with 500 parts of the mono sulfonic acid of phenylated para-rosaniline (alkali blue dye powder), using a weight of 150 pounds on the muller. The surface-active agents are identified by sample numbers in the following table:

Table

| Sample No. | |
|---|---|
| 1 | [structure with $C_6H_{13}-O$, P, S, $CH_2COO-$, $S-CH-COOCH_2CH_2$, $CH_3$, $CH_3-CH-CH_2-CH-CH_3$, $CH_3$]$_2$ Ba |
| 2 | [$C_6H_{13}-O$, P, S, $CH_2COO-$, $S-CH-COOC_{13}H_{27}$]$_2$ Ba |
| 3 | [$C_6H_{13}-O$, P, S, $CH_2-COO-$, $S-CH-COOC_{18}H_{37}$]$_2$ Ba |

The ink properties compared against an ink made from the untreated pigment are shown in the following table:

Table

| Sample No. | Strength | Consistency | Texture |
|---|---|---|---|
| 1 | 107 | moderately lighter | 0 |
| 2 | 115 | do | 0 |
| 3 | 117 | much lighter | 5 |

EXAMPLE 2

Inks were prepared as described in Example 1 using carbon black as the pigment. Improved rheological properties are obtained, the overall consistencies of the inks being moderately lighter than that of the control sample, and there being no noticeable loss in strength.

EXAMPLE 3

The procedure of Example 1 was followed using the following pigments:

| Pigment | Quantities of— | | | Mulls at 150 lb. |
|---|---|---|---|---|
| | Pigment, g. | Mineral Oil, g. | Agent, g. | |
| Phloxine | .700 | 1.100 | .100 | 4×50 |
| Peacock Blue | .700 | 1.100 | .100 | 4×50 |
| Lithol Red | .700 | 1.100 | .100 | 4×50 |
| Chrome Yellow | 2.400 | .440 | .360 | 2×25 |

In each case, the consistency was lighter and in the case of phloxine there was some increase in strength.

EXAMPLE 4

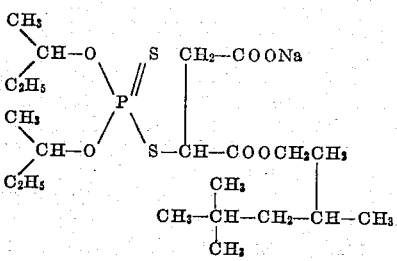

2000 cc. of alkali blue slurry made to contain 40 g. of dry pigment was treated with a dispersion containing 6 g. sodium-3,5,5-trimethyl hexyl di-sec-butyl dithiophosphato succinate
1000 cc. water.

The treated pigment slurry was stirred for three hours and filtered. The filtered pigment was vacuum dried to a constant weight in 24 hours (45°–50° C.).

.860 g. of this pigment was Hoover mulled with 1.600 g. of mineral oil 4×100 revolutions with a 150-lb. pressure. The resulting ink was evaluated versus a similarly prepared ink containing an untreated pigment. The strength of the ink containing the treated pigment was equal to the ink containing the untreated pigment; the consistency was considerably lighter and the texture was five against zero.

EXAMPLE 5

A series of heat-set inks were prepared by incorporating 500 parts of the pigment of Example 1 which were mulled into 1156 parts of a heat-set ink vehicle containing 49% of a modified phenolic resin and 51% of a high boiling paraffin hydrocarbon. The mulling was on a Hoover automatic muller using 150 lbs. pressure with 4×100 revolutions. In sample 1, the vehicle was untreated. Sample 2 had 84 parts of barium octadecyl-(di-hexyl dithiophosphato)-succinate incorporated in the vehicle before mulling. Sample 3 was similar to sample 1 but used a zinc resinate vehicle 52% solids and 48% of a high boiling paraffin hydrocarbon. Sample 4 used the same solvent as sample 3 but added 84 parts of barium octadecyl-(di-hexyl dithiophosphato)-succinate. The following table shows the results obtained.

| Sample No. | Strength, percent | Consistency | Hegman Texture |
|---|---|---|---|
| 1 | 100 | Standard | 0 |
| 2 | 103 | Very Much Lighter | 4.0 |
| 3 | 100 | Standard | 4.5 |
| 4 | 102 | Sl.-Mod. Lighter | 5.0 |

We claim:
1. A pigment dispersed in a predominantly non-aromatic hydrocarbon, said pigment being associated with a sufficient amount of an alkali-forming metal salt of a dialkyldithiophosphato monoalkyl succinate, the total number of carbon atoms in the three alkyl groups being at least eighteen and the amount of the dithiophosphatosuccinate being at least sufficient for a monomolecular film covering the pigment particles.

2. A pigmented, predominantly non-aromatic mineral oil ink, the pigment being associated with a sufficient amount of an alkali-forming metal salt of a dialkyl dithiophosphato monoalkyl succinate, the total number of carbon atoms in the three alkyl groups being at least eighteen and the amount of the dithiophosphatosuccinate being at least sufficient for a monomolecular film covering the pigment particles.

3. An ink according to claim 2 in which the dialkyldithiophosphatosuccinate is a dihexyl dithiophosphatosuccinate.

4. An ink according to claim 3 in which the pigment is alkali blue.

5. An ink according to claim 2 in which the pigment is alkali blue.

6. An ink according to claim 2 in which the dithiophosphatosuccinate is the barium salt of dihexyl dithiophosphato-3,5,5-trimethyl hexyl succinate.

7. An ink according to claim 2 in which the dithiophosphatosuccinate is a barium salt of dihexyl dithiophosphato tridecyl succinate.

8. An ink according to claim 2 in which the dithiophosphatosuccinate is a barium salt of dihexyl dithiophosphato octadecyl succinate.

9. A pigment coated with a layer at least one molecule thick of a alkali-forming salt of a dialkyldithiophosphato monoalkyl succinate, the total number of carbon atoms in the three alkyl groups being at least eighteen.

References Cited in the file of this patent

UNITED STATES PATENTS

| Number | Name | Date |
|---|---|---|
| 1,524,872 | McLeod et al. | Feb. 3, 1925 |
| 2,377,172 | Murphy | May 29, 1945 |
| 2,567,281 | Gardepe | Sept. 11, 1951 |
| 2,578,652 | Cassady | Dec. 18, 1951 |

OTHER REFERENCES

Wolf, "Printing and Litho Inks," 1941, pages 141 and 142.

"Abstracts of the American Chem. Soc.," Decennial Index 31–40, 3554.